3,268,397
METHOD OF CONTROLLING NEMATODES WITH N-(BRANCHED-CHAINED-ALKYL) LACTAMS
Earl P. Williams, Pen Argyl, Pa., assignor to General Aniline & Film Corporation, New York, N.Y., a corporation of Delaware
No Drawing. Filed Oct. 4, 1963, Ser. No. 313,733
6 Claims. (Cl. 167—33)

The present invention relates to a method of controlling and eradicating nematodes from loci in which they are found.

It is known that nematodes, particularly those belonging to the genera heterodera and auguilulina, are agricultural pests attacking the roots, stems, leaves or ears of cultivated plants of various kinds, and cause great deterioration and even destruction of the crop. It has been estimated that the annual loss in the United States due to such plant parasitic nematodes is several hundred million dollars.

The nematocides generally employed in the control and reduction of nematodes include ethylene dibromide, DD (a mixture of 1,3-dichloropylene and 1,2-dichloropropene), chloropicrin, etc. They are not only extremely toxic to plants in both the soil and the air but also emit vapors, breathing of which is dangerous to health and if spilled on the skin will cause irritation. The toxicity to plants while employing these nematocides is so pronounced that manufacturers recommend that they be diffused out of the soil before a crop is planted. With all of these nematocides a water seal must be applied immediately for best results. The treated area must be covered with burlap sacks, canvas and the like which in turn must be sprinkled with water and then removed after 4 or 5 days. The soil is then allowed to aerate, and no seeds planted until every trace of the nematocide has disappeared, which usually takes from 1 to 2 weeks. In wet cool weather, it may take longer. With chloropicrin, under certain weather conditions a blanket of gas may collect over a fumigated bed near the ground, then drift slowly over to a nearby area and cause severe injury to the plants growing there, especially at night when the foliage is wet with dew.

It is an object of the present invention to provide an improved method of protecting loci of chlorophyllaceous plants against destructive damage of nematodes by treatment of said loci with N-(branched-chained-alkyl) lactams.

It is a further object to provide a method of controlling and eradicating nematodes by means of N-(branched-chained-alkyl) lactams which are non-toxic to plants, relatively non-toxic to animals and humans and which do not emit irritating vapors.

Other objects and advantages will become more clearly apparent from the following description:

I have found that N-(branched-chained-alkyl) lactams having the following general formula:

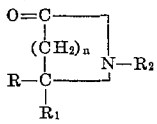

wherein R represents either hydrogen, methyl or ethyl, $R_1$ represents either hydrogen or methyl, $R_2$ represents an alkyl group of from 6 to 18 carbon atoms containing at least one branched-chained-alkyl substituent of from 1 to 3 carbon atoms, and $n$ represents a positive integer of from 2 to 4, are very effective nematocides.

The N-(branched-chained-alkyl) lactams characterized by the foregoing general formula are readily prepared by conventional means, by treating 1 mole of a lactone with 1 mole of an alkyl primary amine of from 6 to 18 carbon atoms and containing at least one branched chained alkyl substituent of one to three carbon atoms at 250° C. under pressure. Such method is fully described by Reppe in Ann. 596, 202–203, 1955.

As illustrative examples of lactones which may be treated with the branched-chained-alkyl primary amine the following may be mentioned:

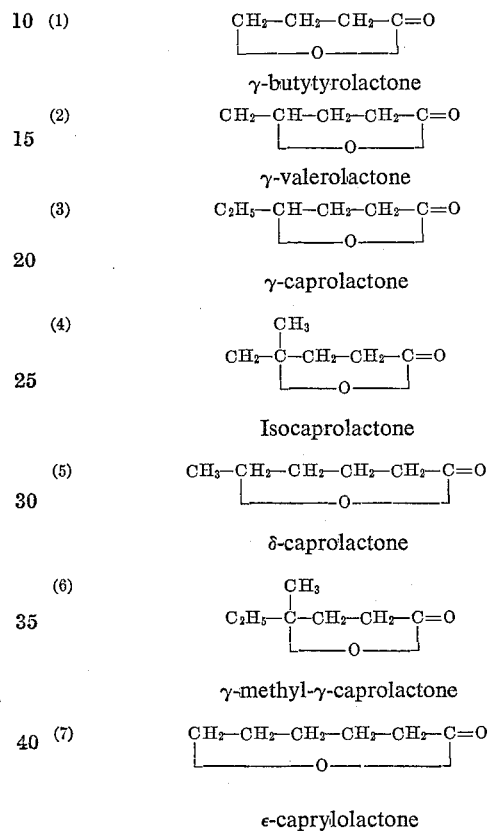

As illustrative examples of branched-chained-alkyl primary amines the following may be mentioned: 2-ethyl butyl amine; 3,5,5-trimethylhexyl; 2,4,6,8 tetramethylnonyl amine; 2-ethyl-3,5,7 trimethyloctyl amine; 2-ethyldecyl amine; 2-ethyl-4,6-dimethyloctyl amine; 2,4,6,6,8 pentamethylnonyl amine, 2-methylhexyl amine, 3-methylamyl amine, 3-ethylamyl amine, 3-ethyl-4,4-dimethylbutyl amine, 2-ethyloctyl amine, 2-ethylhexadecyl amine, 2-ethylhexyl amine; 2,4,6,8 tetramethyl undecyl amine; 2-propylhexyl amine, etc.

The following example will illustrate the procedure which any one of the foregoing lactones is treated with any one of the foregoing branched-chained-alkyl primary amines to yield a nematocide conforming to the foregoing general formula:

214.8 grams, 1.5 moles, of 3,5,5-trimethylhexyl amine and 137.7 grams, 1.6 moles of γ-butyrolactone were heated together at 95 to 108° C. for a period of 6¾ hours. A portion of the reaction mixture titrated for unreacted amine showed that the consumption of amine equalled 96.5%.

200 grams of the above N-3,5,5-trimethylhexyl-γ-hydroxy-butyramide was charged to an autoclave and heated in 3 hours to 250° C. p.s.i.g. 155 and then held for an additional 8 hours at 250° C. during which time the pressure increased from 155 p.s.i.g. to 230 p.s.i.g. The two phase oily liquid, about 184 grams, was discharged into an 18 inch vigreaux column equipped for vacuum distillation and distilled into 4 fractions under the following conditions:

| Fraction | Trap Temp., °C. | Volume, ml. | Bath Temp., °C. | Pressure, mm. | Remarks |
|---|---|---|---|---|---|
| 1 | 35 | 4 | 130 | 12 | Removed water formed. |
| 2 | 76–113 | 27 | 116–131 | 0.01 | Do. |
| 3 | 116–119 | 134 | 139–160 | 0.01 | Do. |
| 4 | 126–131 | 13 | 165–191 | 0.01 | Do. |

Fraction No. 3 representing N-(3,5,5-trimethylhexyl) pyrrolidone labeled as 1, was subjected to carbon and hydrogen analysis with the following results:

|  | Found | Calculated |
|---|---|---|
| Carbon | 73.81 | 73.87 |
| Hydrogen | 11.98 | 11.92 |

While following the procedure of the above example the following N-(branched-chained-alkyl) lactams 2 to 11, were prepared:

(2) N-(2-ethylbutyl)pyrrolidone
(3) N-(2,4,6,6,8-pantamethylnonyl)pyrrolidone
(4) N-(2-ethyl-4,6-dimethyloctyl)pyrrolidone
(5) N-(2-ethyldecyl)pyrrolidone
(6) N-(2-ethyl decyl)-5-methyl-pyrrolidone
(7) N-(2-ethyl butyl)-5-ethyl-pyrrolidone
(8) N-(2-ethyl decyl)-5,5-dimethyl-pyrrolidone
(9) N-(3,5,5-trimethylhexyl)-6-methyl-piperidone
(10) N-(2-ethylmethyl)-5-methyl-5-ethyl-pyrrolidone
(11) N-3,5,5-trimethylhexyl)-ε-caprylolactam The N-(branched-chained-alkyl) lactams are readily dispersible in the soil and as a consequence more readily effective as nematocides within a short period of time. They are readily soluble in the usually selected isoparaffinic hydrocarbons, straight chain liquid hydrocarbons, naphthas, deodorized kerosene, alcohols such as ethanol isopropanol and the like. All of the N-(branched-chained-alkyl) lactams characterized by the foregoing formula are effective as nematocides on a weight basis of from 0.001 to 25% for open fields, from 15 to 30 pounds per acre may be used either in dilute form either in solution with the aforementioned solvents aqueous emulsion or in admixture with a solid carrier so that the nematocidal composition can be readily applied by the well-known dusting methods. Suitable solid carriers generally employed include pumice, talc or clay, etc. In solution, i.e. in any of the aforementioned hydrocarbons or alcohols they are readily dispersed in soil and do not require diffusion prior to planting. The most important properties of the N-(branched-chained-alkyl) lactams are that they are neither primary irritants nor skin sensitizers and as a consequence toxicity to humans and warm blooded animals is extremely low. The precise amount of the N-(branched-chained-alkyl) lactams to be employed in the control and eradication of soil nematocides is not critical and the effective amount to be employed, depending upon whether the application is to be made in the field, greenhouse, flats or pots, is readily determined by routine trial experiments. For field and greenhouse applications I have found it desirable that the N-(branched-chained-alkyl) lactams be prepared in the form of aqueous emulsions in a concentration of from 5 to 500 parts per million parts of soil and applied at a temperature of from 50–80° F. Application of the aqueous emulsion above 80° F. has no adverse effect.

A very satisfactory method of applying the N-(branched-chained-alkyl) lactams into the soil is by the injection method. In other words the nematocide is injected directly into the soil wherein the holes or other openings have been made. The amount of injecting material may range from 5 to 15 cc.'s of a 50 by weight concentration of either a solution or emulsion of the nematocide.

The following will illustrate the test procedure and the results obtained with each one of the foregoing N-(branched-chained-alkyl) lactams: The nematocidal test consists of fumigating a brei of heavily infested roots of tomato plants in moist sand for 24 hours prior to suspending the sample on No. 100 mesh stainless steel screens in adequate water.

Duplicate 100 gram samples of dry sand were mixed with 5 gram samples of a brei of tomato roots infested with root-knot nematodes, *Meliodogyne incognita*. The brei was prepared by cutting tomato roots of infested plants into quarter inch lengths, then further macerating in a Waring blendor for one minute. The sand and the brei were mechanically mixed by shaking for one minute in a closed Mason jar. The mixture was transferred to 2¼" clay pots to which the test compound was added as follows: 50 mg. of test compound was added as 5 mls. of a 1% stock solution prepared by dissolving one gram of the chemical to be tested in 10 mls. of acetone. To this is added three drops of a 0.1 aqueous solution of an emulsifier, obtained by condensing 1 mole of nonyl phenol with 9 moles of ethylene oxide, and the resulting solution diluted to 100 mls. with water. Each pot was then wrapped in Saran and allowed to stand for 24 hours.

The mixture was then transferred to stainless steel cylindrical screens, approximately 2½" high and 3½" in diameter. The screen material was 100 mesh stainless steel wire cloth. These screens were placed in the bottom half of a 9 cm. Petri dish containing 25 ml. of 10 mls. of distilled water and covered with the Petri dish cover. In a short time an additional 10 mls. of distilled water was added to each plate in order that free water be available in the dish. After 24 hours microscopic counts were made of the living nematodes which migrated through the screen and into the Petri dish.

Since the N-(branched-chained-alkyl) lactams are non-fumigant compounds, nematodes may not make adequate contact with them until after the water is added. Therefore, these compounds are read 48 hours after transferring to the screen.

Nematode counts were made by microscope. At least 10 fields were read or 150 nematodes counted per dish. Each N-(branched-chained-alkyl) lactam was run in duplicate. The results obtained were as follows:

| Nematocidal Agent of Illustration | Nematodes in 10 Fields ||
|---|---|---|
|  | Living | Dead |
| 1 | 2 | 9 |
| 2 | 3 | 7 |
| 3 | 2 | 10 |
| 4 | 3 | 8 |
| 5 | 2 | 9 |
| 6 | 2 | 9 |
| 7 | 2 | 9 |
| 8 | 3 | 8 |
| 9 | 2 | 9 |
| 10 | 2 | 9 |
| 11 | 3 | 8 |
| Blank Control [1] | 80 | 5 |

[1] The same formulation as the 1% stock solution except that no test compound is added.

In order to determine the effectiveness of the N-(branched-chained-alkyl) lactams against root-knot nematode, infective migratory larvae of the root-knot nematode, *Meliodogyme incognita* var. *acrita* reared in the greenhouse on roots of Bonney Best Variety tomato plants was employed as the test organism. Infected plants were removed from the culture, cut to ½ inch lengths by scissors, then placed in a Waring Blendor to blend at high speed with sufficient water to cover the root mass. Blending was confined to one minute. This inoculum was added to soil at the rate of a tablespoonful to 1000 grams of soil. The soil was blended by hand and placed in pots for one week. During this period eggs of the nematode hatch and the larvae forms migrate into the soil.

After one week incubation the nematocidal agent is added to the soil. This was done by hollowing out a depression approximately ⅓ the depth of the soil and adding 50 ml. of the 1% stock solution described in the previous test is added to the soil. The concentration is 500 parts per million.

After standing for one week the pots were then sown to tomato seed and placed in the greenhouse where they were cared for in the normal fashion for approximately six weeks. Should the agent affect germination of the seed they must be replanted at weekly intervals until sufficient germination is obtained to measure root galling of from six to ten plants.

The tomato plants were carefully removed from the pots at the conclusion of the test, the soil washed from the roots and the amount of galling visually rated according to the following designations:

(1) More than 25 galls per plant, no control
(2) 16–25 galls per plant, light control
(3) 10–15 galls per plant, fair control
(4) 1–9 galls per plant, good control
(5) 0 galls per plant, perfect control The results of the foregoing test against root-knot nematode are as follows:

| Nematocidal agent of illustration— | Rating |
|---|---|
| (1) | 5 |
| (2) | 5 |
| (3) | 5 |
| (4) | 5 |
| (5) | 5 |
| (6) | 5 |
| (7) | 5 |
| (8) | 5 |
| (9) | 5 |
| (10) | 5 |
| (11) | 5 |
| Blank Control | 1 |

I claim:
1. The method of protecting chlorophyllaceous plants against nematodes which comprises applying to nematodes a nematocidal amount of a N-(branched-chained-alkyl) lactam having the following formula:

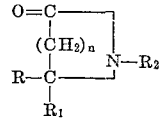

wherein R represents a member selected from the class consisting of hydrogen, methyl and ethyl, $R_1$ represents a member selected from the class consisting of hydrogen and methyl, $R_2$ represents an alkyl group of from 6 to 18 carbon atoms containing at least one branched-chained-alkyl substituent of from 1 to 3 carbon atoms and $n$ represents a positive integer of from 2 to 4.

2. The process according to claim 1 wherein the N-(branched-chained-alkyl) lactam is N-(3,5,5,-trimethylhexyl) pyrrolidone.

3. The process according to claim 1 wherein the N-(branched-chained-alkyl) lactam is N-(2 ethylbutyl pyrrolidone).

4. The process according to claim 1 wherein the N-(branched-chained-alkyl) lactam is N-(2,4,6,6,8-pentamethylnonyl) pyrrolidone.

5. The process according to claim 1 wherein the N-(branched-chained-alkyl) lactam is N-(2-ethyl-4,6-dimethyloctyl) pyrrolidone.

6. The process according to claim 1 wherein the N-(branched-chained-alkyl) lactam is N-(2 ethyldecyl) pyrrolidone.

References Cited by the Examiner

UNITED STATES PATENTS

| 2,945,863 | 7/1960 | Buc et al. | 167—33 X |
| 3,085,931 | 4/1963 | Darlington | 167—33 |

LEWIS GOTTS, *Primary Examiner.*

RICHARD L. HUFF, *Assistant Examiner.*